(12) United States Patent
Kojima et al.

(10) Patent No.: US 7,200,095 B2
(45) Date of Patent: Apr. 3, 2007

(54) METHOD AND APPARATUS FOR MEASURING A MINUTE PITCH

(75) Inventors: Yoshiaki Kojima, Saitama (JP); Osamu Kasono, Saitama (JP)

(73) Assignee: Pioneer Corporation (JP)

( * ) Notice: Subject to any disclaimer, the term of this patent is extended or adjusted under 35 U.S.C. 154(b) by 580 days.

(21) Appl. No.: 10/658,271

(22) Filed: Sep. 10, 2003

(65) Prior Publication Data
US 2004/0057364 A1    Mar. 25, 2004

(30) Foreign Application Priority Data
Sep. 13, 2002    (JP)    ............. P2002-267573

(51) Int. Cl.
*G11B 7/00*    (2006.01)
(52) U.S. Cl. ...................... 369/101; 369/53.2
(58) Field of Classification Search ............... None
See application file for complete search history.

(56) References Cited

U.S. PATENT DOCUMENTS 5,585,629 A    12/1996    Doran et al.
6,307,826 B1*  10/2001    Katsumura et al. ......... 369/101
6,483,796 B1*  11/2002    Hagiwara ................... 369/101
6,919,577 B2*   7/2005    Watanabe et al. ......... 250/559.4

FOREIGN PATENT DOCUMENTS

JP    8-22794 A    1/1996
JP    8-329533 A    12/1996

* cited by examiner

*Primary Examiner*—Paul W. Huber
(74) *Attorney, Agent, or Firm*—Steven A. Wong; Caroline T. Do

(57) ABSTRACT

An optical disk 11 (sample) is laid on a sample moving unit 21 within a vacuum chamber 20. An electron beam radiating mechanism 30 radiates an electron beam to the optical disk 11 while moving the optical disk 11 at a constant speed. Electron detecting means 27 detects an electron from the optical disk 11. Thus, the track pitch is measured on the basis of a detected electron signal and a measured movement amount of the optical disk 11. Also, the electron beam radiating mechanism 30 is provided with a fast deflector 33 for averaging within a deflection area to measure the track pitch.

7 Claims, 3 Drawing Sheets

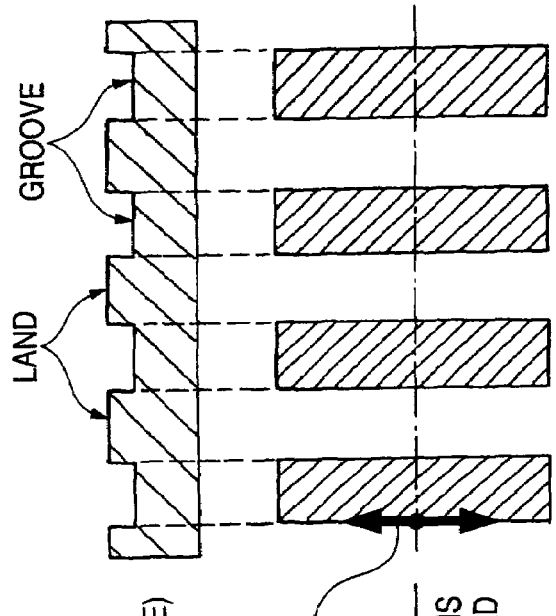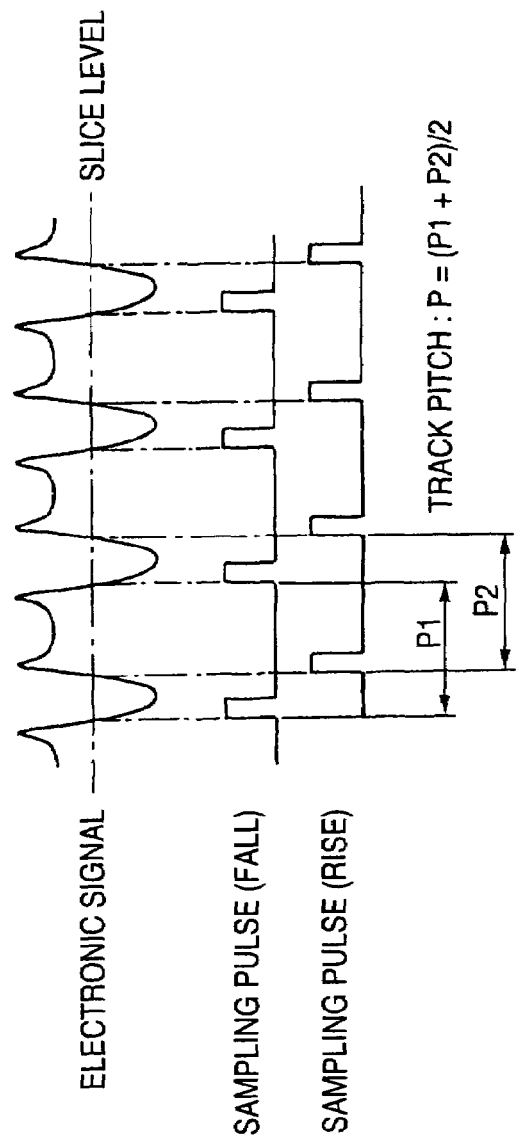

METHOD AND APPARATUS FOR MEASURING A MINUTE PITCH

CROSS REFERENCE OF RELATED APPLICATION

This application is based on and claims priority under 35 U.S.C. § 119 with respect to Japanese Patent Application No. 2002-267573 filed on Sep. 3, 2002, the entire content of which is incorporated herein by reference.

BACKGROUND OF THE INVENTION

1. Field of the Invention

The present invention relates to a minute pitch measuring method and apparatus, and more particularly to a minute pitch measuring method and apparatus for measuring a track pitch of an optical disk or the like.

2. Description of the Related Art

Conventionally, the minute pitch or track pitch of an optical disk is measured by using an optical microscope. For example, the track pitch is measured by applying a laser beam to the optical disk, and observing its diffracted light (see JP-A-8-329533 (FIG. 12, page 2)).

FIG. 1 shows a schematic constitution of a conventional track pitch measuring apparatus and method. Referring to FIG. 1, the track pitch measuring method will be described below.

As shown in FIG. 1, a conventional track pitch measuring apparatus 50 for optical disk measures a track pitch Tp for the track T of an optical disk 52 by applying a laser beam from a laser generating part 51 for generating the laser beam to the optical disk 52, employing a gas laser or semiconductor laser represented by a helium-neon laser, and observing its diffracted light on a screen 53.

A beam diameter of the laser beam is as large as about 0.3 to 1 mm, in which the track pitch is measured by applying a laser beam to the optical disk 52, and performing an averaging process over its irradiated area.

Herein, assuming that the interval between the zeroth order diffracted light L0 and the first order diffracted lights L+, L− is d, and the interval between the optical disk 52 and the screen 53 is L, the track pitch Tp is represented such as, $TP = (\lambda/d) \times L$ By the way, in the case of an optical microscope, a resolution limit is decided by the laser wavelength $\lambda$ and the numerical aperture NA of an objective lens. At present, a high resolution microscope having a ultraviolet laser ($\lambda$=266 nm) and an objective lens of NA 0.9 is commercially available, in which the resolution limit is about 0.15 μm.

If the optical disk has a higher density with a narrower track pitch (e.g., 0.3 μm or less) in the future, there is a problem that the track pitch is not measured accurately, because the above optical microscope is also close to the resolution limit (0.15 μm). Also, since the track pitch is measured in each observation area through the sequential feed with a stepping motor, it takes a considerable measurement time to measure the entire area of disk.

SUMMARY OF THE INVENTION

This invention has been achieved in the light of the above-mentioned problems, and it is an object of the invention to provide a minute pitch measuring method and apparatus capable of measuring a narrow pitch at high precision in a short time when an optical disc has a narrow track pitch.

In order to accomplish the above object, according to a first aspect of the invention, there is provided a minute pitch measuring method including applying an electron beam to the surface of a sample while moving the sample relatively in a measuring direction, and acquiring an electronic signal from the surface of the sample to measure a minute pitch of the sample.

According to a second aspect of the invention, there is provided a minute pitch measuring apparatus comprising an electron beam radiating mechanism for radiating an electron beam to the surface of a sample, a sample moving unit for moving the sample in a measuring direction relatively to the electron beam radiating mechanism, an electron detector for detecting an electron from the surface of the sample, and a calculating unit for calculating a minute pitch from an electronic signal detected by the electron detector and the position of the sample.

BRIEF DESCRIPTION OF THE DRAWINGS

These and other objects and advantages of this invention will become more fully apparent from the following detailed description taken with the accompanying drawings in which:

FIGS. 3A to 3E are diagrams for explaining a minute pitch measuring method according to the embodiment of the invention.

DETAILED DESCRIPTION OF THE PREFERRED EMBODIMENTS

A minute pitch measuring method and apparatus according to an embodiment of the present invention will be described below in detail with reference to the accompanying drawings.

Figure 1:
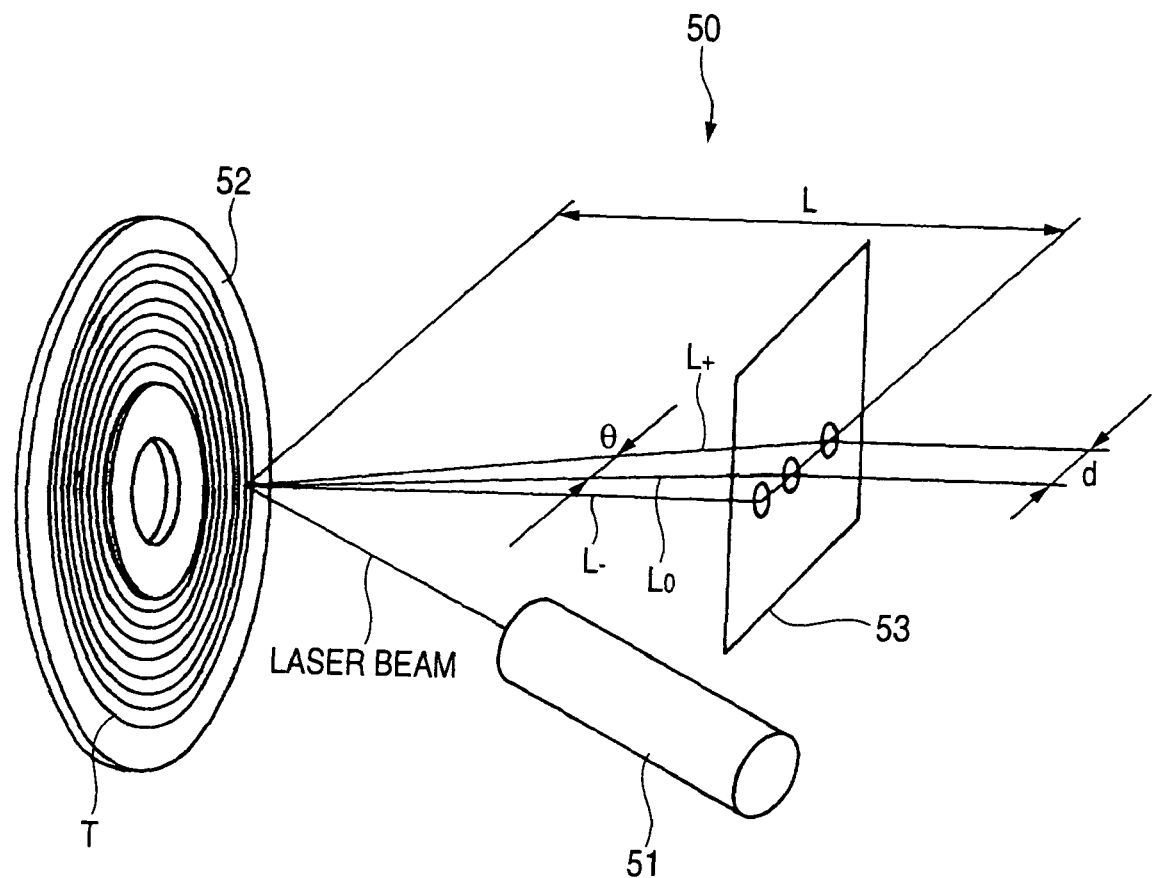
FIG. 1 is a schematic constitutional view for explaining a conventional track pitch measuring apparatus and method.
Figure 2:
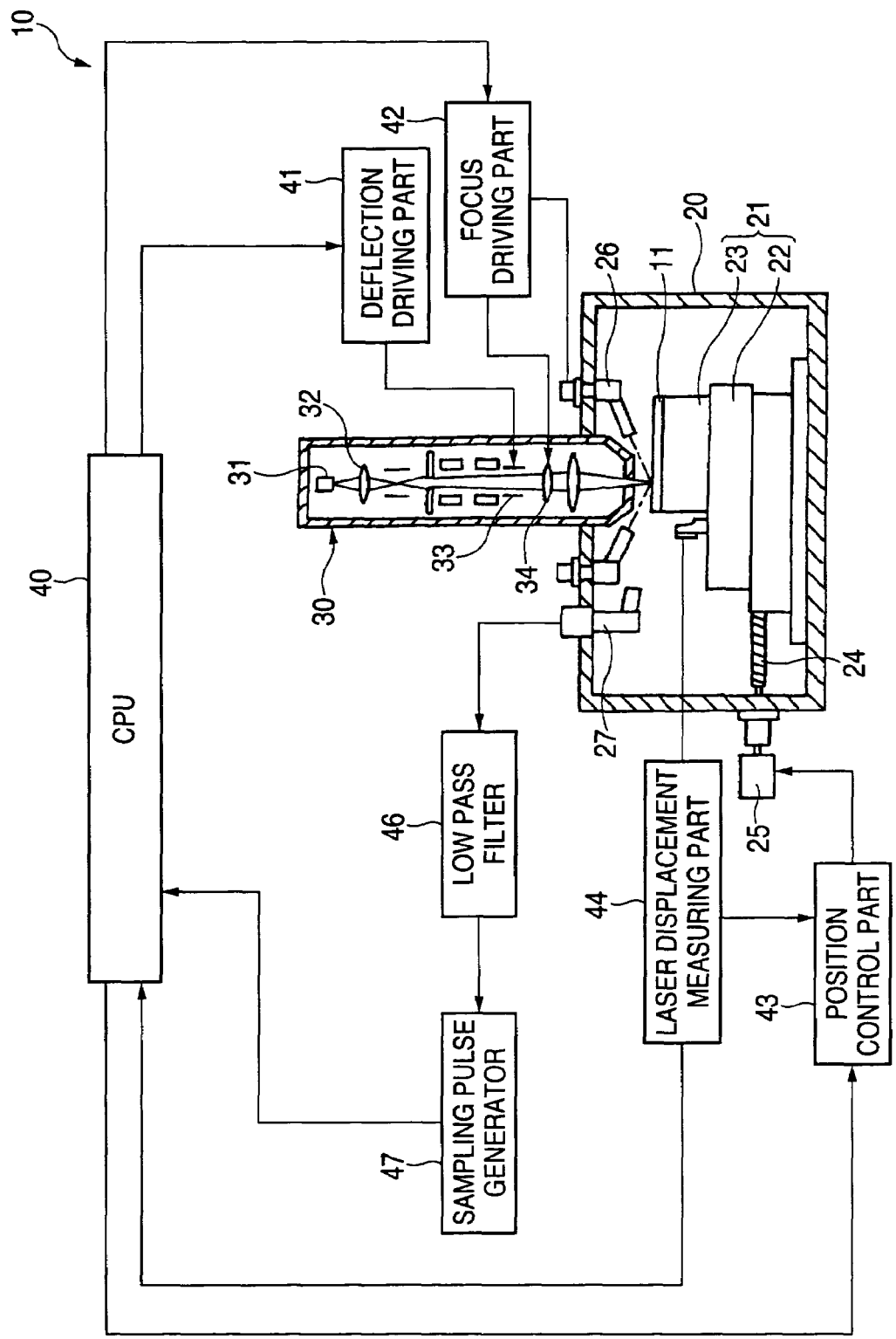
FIG. 2 is a block diagram showing the constitution of a minute pitch measuring apparatus according to an embodiment of the invention.

FIG. 2 is a block diagram showing the constitution of the minute pitch measuring apparatus according to the embodiment of the invention.

As shown in FIG. 2, the minute pitch measuring apparatus 10 comprises a vacuum chamber 20, an electron beam radiating head 30 that is an electron beam radiating mechanism for radiating an electron beam to an optical disk 11 as a sample to measure the track pitch within the vacuum chamber 20, and a CPU 40 that is control and an operation unit for various units within the electron beam radiating head 30 and the vacuum chamber 20.

The electron beam radiating head 30 comprises an electron gun 31 for radiating electron beam, a convergent lens 32 for converging electron beam, a beam deflecting electrode 33 that is a fast deflector, and a focus adjusting lens 34 as a focus adjusting mechanism for adjusting a focus of electron beam, a top end portion (lower end portion) of the electron beam radiating head 30 being disposed inside the vacuum chamber 20.

The beam deflecting electrode 33 is controlled via a deflection driving part 41 by the CPU 40 to deflect electron beam fast in a direction orthogonal to a measuring direction.

The focus adjusting lens 34 is controlled via a focus driving part 42 by the CPU 40 so that electron beam is converged into a predetermined diameter or less on the surface of the optical disc 11.

Within the vacuum chamber 20, there is provided a sample moving unit 21 for moving the optical disk 11 in the measuring direction (to the left or right in FIG. 2) relatively to the electron beam radiating head 30.

The sample moving unit 21 comprises an X stage 22 that moves in the X-axis direction, or the measuring direction, and a YZθ stage 23 that moves in other directions, including the Y-axis direction orthogonal to the X-axis direction, the Z-axis direction and the rotation direction. The optical disk 11 is laid on a YZθ stage 23.

The X stage 22 is moved via a ball screw 24 by a DC motor 25. The DC motor 25 is controlled via a position control part 43 by the CPU 40.

A position in the measuring direction on the X stage 22 is measured by a laser displacement measuring part 44 and a position signal is sent to the CPU 40.

Within the vacuum chamber 20, there is provided a height sensor 26 for sensing the surface height of the optical disk 11, in which the measured value is sent to the CPU 40.

Accordingly, the CPU 40 controls the driving of the focus driving part 42 based on the surface height of the optical disk 11 measured by the height sensor 26 to focus the electron beam on the surface of the optical disk 11 with a beam diameter of 50 nm or less, for example.

Also, within the vacuum chamber 20, there is provided an electron detector 27 that is electron detecting means for detecting secondary electrons from the surface of the optical disk 11 radiated by the electron beam radiating head 30.

An electron signal detected by the electron detector 27 is sent through a low pass filter 46 to a sampling pulse generator 47 described later, and processed by the CPU 40.

Referring to FIGS. 2 and 3, the minute pitch measuring method according to this embodiment will be described.

The minute pitch measuring method in this embodiment involves applying an electron beam from the electron beam radiating head 30 to the surface of the optical disk (sample) 11 while moving the X stage 22 at a constant speed in the measuring direction using the DC motor 25, detecting secondary electrons from the surface of the optical disk 11 using the electron detector 27, and measuring the track pitch from a detection signal through the arithmetical operation of the CPU 40 in the minute pitch measuring apparatus 10 as shown in FIG. 2.

The X stage 22 is moved at high accuracy under the closed loop control of the laser displacement measuring part 44, the DC motor 25 and the position control part 43.

FIG. 3 is a diagram for explaining the method for measuring the track pitch from the electronic signal detected by the electron detector 27.

FIG. 3A shows a cross section of the optical disk 11 that is the sample, in which a groove of concave shape provided helically or concentrically and a land of convex shape are provided alternately to form a recording track on the disk surface. Herein, the track pitch to be measured is an interval between adjacent grooves.

The electron beam radiating head 30 radiates an electron beam to the surface of the optical disk 11 while the optical disk 11 on the X stage 22 is being moved at a constant speed in the X direction (measuring direction) using the DC motor 25. In radiating electron beam, the electron beam is deflected in the Y direction (direction orthogonal to the measuring direction) within a predetermined deflection area, as shown in FIG. 3B. That is, the deflection driving part 41 is driven under the control of the CPU 40 to apply a sinusoidal voltage to the beam defection electrode 33 and deflect the electron beam fast within the predetermined deflection area.

The electron beam radiating head 30 radiates the electron beam to the surface of the optical disk 11, and the electron detector 27 detects electrons from the optical disk 11, as shown in FIG. 3B. Then, an electronic signal output from the electron detector 27 is shown in FIG. 3C. This electronic signal corresponds to the mean value of intensity of reflected beam within the deflection area deflected fast in the Y direction (direction orthogonal to the measuring direction).

The electronic signal as shown in FIG. 3C is sliced at a certain slice level by the low pass filter 46, whereby sampling pulses at the trailing edge of the electronic signal are acquired as shown in FIG. 3D by the sampling pulse generation 47. Similarly, sampling pulses at the leading edge of the electronic signal are acquired as shown in FIG. 3E.

The sampling pulses of FIG. 3D are pulse signals generated in the right edge part of the groove as shown in FIG. 3B, and the sampling pulses of FIG. 3E are pulse signals generated in the left edge part of the groove.

Each sampling pulse is sent to the CPU 40, while the position in the measuring direction of the X stage 22 corresponding to the sampling pulse at the trailing edge is measured by the laser displacement measuring part 44, and a position signal is sent to the CPU 40.

With the above arrangement, the mean value P1 of movement amount of the X stage 22 corresponding to the sampling pulse interval at the trailing edge is obtained.

Similarly, the mean value P2 of movement amount of the X stage 22 corresponding to the sampling pulse interval at the leading edge is obtained.

Moreover, the CPU 40 calculates the mean value P of P1 and P2 (P=(P1+P2)/2). In this manner, the track pitch is acquired as the mean value P of interval between adjacent grooves on the optical disk 11.

The minute pitch measuring method of this embodiment involves measuring the interval between adjacent grooves as the track pitch as previously described. However, the interval between pit series recorded in the recording track on the optical disk 11 may be measured. Also, the width or length of pit itself may be measured for the measurement of minute pitch.

With the above minute pitch measuring method and apparatus, since the track pitch is measured using the electron beam, the higher resolution is attained than with the conventional method using the optical microscope, whereby it is possible to measure the narrow track pitch (e.g., 0.3 μm or less) and the minuter pitch with high accuracy.

In the case where the optical disk 11 is a compact disk (CD), if the CD recording area 34 mm is measured when the X stage 22 has a feed speed of 5 μm/s, it takes about 2 hours or less to measure the track pitch. In this manner, the track pitch can be measured in a short time.

Also, the electron beam is deflected fast in the direction orthogonal to the measuring direction by the beam deflecting electrode 33 that is the fast deflector, and averaged within the deflection area to acquire the track pitch, whereby the measurement is made with higher accuracy than without deflection. Also, it is possible to measure not only the track pitch but also the pit shape (width, length and so on) that could not be measured before.

Also, when the electron beam radiating mechanism radiates electron beam to the sample surface, the focus adjusting mechanism can always focus electron beam on the sample surface, whereby the resolution of electron beam is enhanced.

The minute pitch measuring method and apparatus of this invention are not limited to those of the above embodiment, but various variations or modifications may be made appropriately.

For example, electrons detected by the electron detector 27 are not limited to secondary electrons, but may be reflected electrons. Thus, when reflected electrons are detected, the same minute pitch measuring apparatus and method may be employed to measure the minute pitch with the same effects.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiment sand with various modifications as are suited to the particular use contemplated. It is intended that the scope of the invention be defined by the claims appended hereto, and their equivalents.

What is claimed is:

1. A minute pitch measuring method comprising:
   applying an electron beam to the surface of a sample while moving the sample relatively in a measuring direction; and
   acquiring an electronic signal from the surface of the sample to measure a minute pitch of said sample.

2. The minute pitch measuring method according to claim 1, further comprising:
   generating a sampling pulse from the measured electronic signal; and
   measuring the minute pitch of said sample from an interval at a rising position or falling position of the sampling pulse.

3. The minute pitch measuring method according to claim 1, wherein the minute pitch is a track pitch.

4. A minute pitch measuring apparatus comprising:
   an electron beam radiating mechanism for radiating an electron beam to the surface of a sample;
   a sample moving unit for moving said sample in a measuring direction relatively to the electron beam radiating mechanism;
   an electron detector for detecting an electron from the surface of the sample; and
   a calculating unit for calculating a minute pitch from an electronic signal detected by the electron detector and the position of the sample.

5. The minute pitch measuring apparatus according to claim 4, wherein the minute pitch is a track pitch.

6. The minute pitch measuring apparatus according to claim 4, wherein the electron beam radiating mechanism comprises a focus adjusting mechanism for adjusting a focus of the electron beam based on a measurement result of measuring the distance to the surface of the sample.

7. The minute pitch measuring apparatus according to claim 4, wherein the electron beam radiating mechanism comprises a fast deflector for deflecting the electron beam.

* * * * *